United States Patent [19]

Pavlath

[11] Patent Number: 4,666,235
[45] Date of Patent: May 19, 1987

[54] STABLE FIBER OPTIC POLARIZER

[75] Inventor: George A. Pavlath, Thousand Oaks, Calif.

[73] Assignee: Litton Systems, Inc., Beverly Hills, Calif.

[21] Appl. No.: 589,977

[22] Filed: Mar. 16, 1984

[51] Int. Cl.$^4$ .............................................. G02B 5/30
[52] U.S. Cl. ........................... 350/96.15; 350/96.29; 350/395; 350/406
[58] Field of Search ............... 350/96.15, 96.16, 96.29, 350/96.30, 394, 395, 400, 401, 406, 162.17, 162.2, 96.33, 96.34, 163, 164

[56] References Cited

U.S. PATENT DOCUMENTS

| | | | |
|---|---|---|---|
| 3,625,589 | 12/1971 | Snitzer | 350/96 |
| 3,645,603 | 2/1972 | Smith | 350/149 |
| 4,089,582 | 5/1978 | Mahlein et al. | 350/395 X |
| 4,139,262 | 2/1979 | Mahlein et al. | 350/96.33 |
| 4,268,116 | 5/1981 | Schmadel et al. | 350/96.29 |
| 4,386,822 | 6/1983 | Bergh | 350/96.15 |
| 4,389,090 | 6/1983 | LeFevre | 350/96.29 |
| 4,410,275 | 10/1983 | Shaw et al. | 356/350 |
| 4,431,260 | 2/1984 | Palmer | 350/96.15 |
| 4,456,377 | 6/1984 | Shaw et al. | 356/350 |
| 4,461,574 | 7/1984 | Shaw et al. | 356/350 |
| 4,515,441 | 5/1985 | Wentz | 350/395 |
| 4,529,312 | 7/1985 | Pavlath et al. | 356/350 |
| 4,583,818 | 4/1986 | Chen et al. | 350/96.19 |
| 4,589,728 | 5/1986 | Dyott et al. | 350/96.30 |

FOREIGN PATENT DOCUMENTS

| | | | |
|---|---|---|---|
| 3305104 | 8/1984 | Fed. Rep. of Germany | |
| 8402006 | 5/1984 | PCT Int'l Appl. | 350/96.15 |

OTHER PUBLICATIONS

Eickhoff, "In-Line Fibre-Optic Polariser", *Electronics Lett.*, vol. 16, No. 20, Sep. 1980, pp. 762–764.
Hosaka et al, "Single-Mode Fiber-Type Polarizer", *IEEE J. Quantum Electronics*, vol. QE-18, No. 10, Oct. 1982, pp. 1569–1572.
Hosaka et al, "Fabrication of Single-Mode Fiber-Type Polarizer", *Optics Letters*, vol. 8, No. 2, Feb. 1983, pp. 124–126.
Johnson, M., "In-Line Fiber-Optical Polarization Transformer", *Appl. Optics*, vol. 18, No. 9, May 1, 1979, pp. 1288–1289.
Mohr, F. A. & Scholz, U. "Polarization Control for an Optical Fiber Gyroscope", *Fiber Optic Rotation Sensors and Related Technology*, Springer Verlag, 1982, pp. 163–168.
Alekseev et al., "Polarization Modulation of the Radiation in a Single-Mode Fiber Lightguide", *Pisma Zh. Tekh. Fiz.* 5, Jul. 26, 1979, pp. 887–890.
Ulrich, R., "Polarization Stabilization on Single-Mode Fiber" *Appl. Phys. Lett.*, 35(11), Dec. 1, 1979, pp. 840–842.
Kintner, E. C., "Polarization Problems in Optical Fiber Gyroscopes", *Applied Optics*, pp. 78–81.
LeFevre et al., "Progress in Optical Fiber Gyroscopes Using Integrated Optics".
Gruchmann et al., "Fibre-Optic Polarizers with High Extinction Ratio" *Elsewier Science Publishers B.V.* 1983, pp. 305–308.
Pavlath et al., Fiber Optic Gyroscopes: Advances and Future Developments, Navigation: Journal of the Institute of Navigation, vol. 31, No. 2, Summer 1984, pp. 70–83.
Flanders, Submicrometer Periodicity Gratings as Artificial Anisotropic Dielectrics, *Applied Physics Letters*, 42 (6), Mar. 1983, pp. 492–494.

*Primary Examiner*—John Lee
*Attorney, Agent, or Firm*—John H. Lynn

[57] ABSTRACT

This invention relates to fiber optic apparatus and methods for polarizing light for use in fiber optic devices, such as rotation sensors. A phase grating formed of alternating layers of dielectrics having different indices of refraction is placed adjacent a half coupler that includes a fiber having a cladding thickness which forms an interaction region. The evanescent field of light of a selected polarization interacts with the phase grating to cople out of the fiber while light of a second selected polarization remains in the fiber.

9 Claims, 5 Drawing Figures

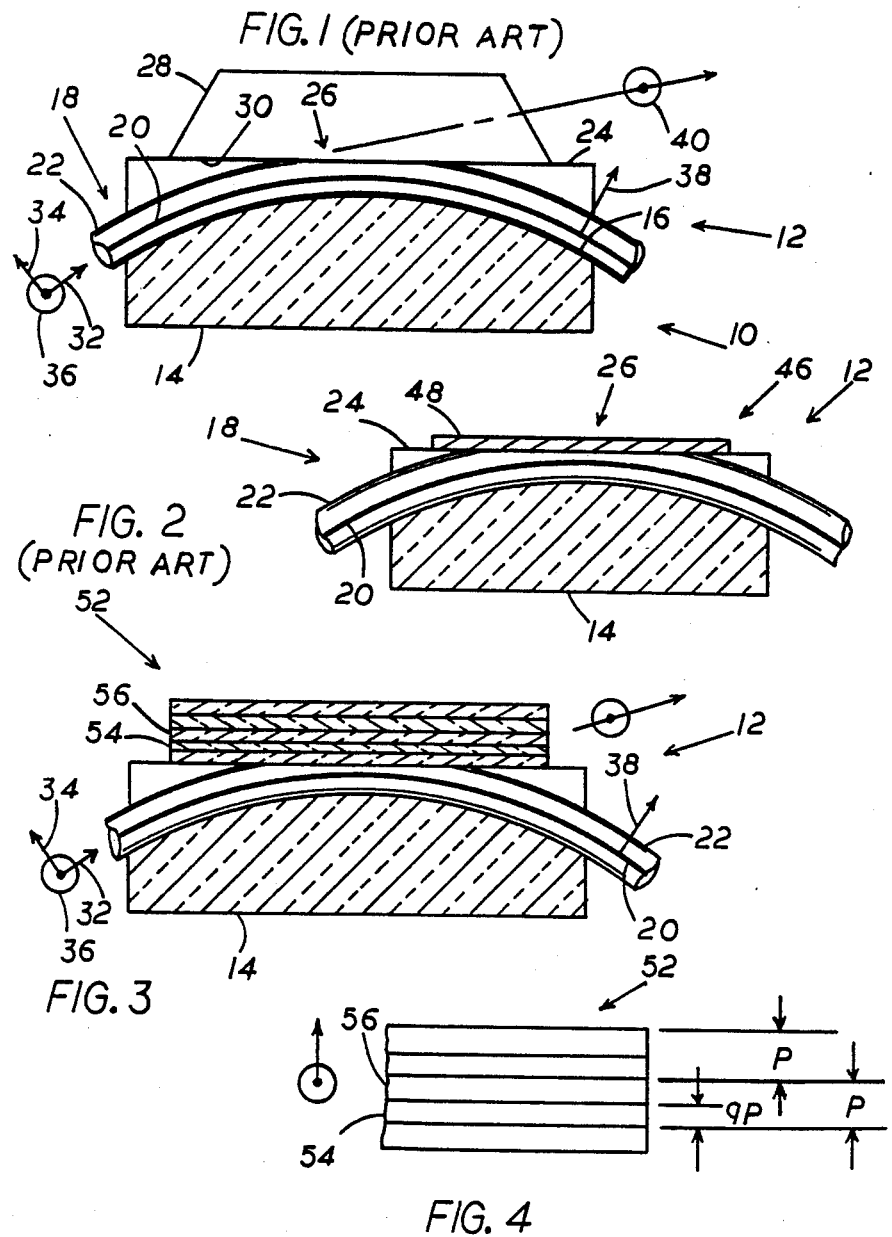

STABLE FIBER OPTIC POLARIZER

BACKGROUND OF THE INVENTION

This invention relates generally to apparatus and methods for polarizing light and particularly to fiber optic apparatus and methods for providing light of a predetermined polarization.

It is well known that in many fiber optic systems, it may be desirable to have light of a known polarization state at selected points for input to components whose operation is polarization dependent in order to minimize errors. The state of polarization is particularly important in a device such as an optical fiber rotation sensor. In a polarized optical fiber rotation sensing system, drift errors due to changes in polarization are determined by the quality of the polarizer.

A linear polarization state in a fiber optic rotation sensor is typically achieved with some type of linear polarizer such as the fiber optic polarizer described in U.S. Pat. No. 4,386,822 to Bergh. The polarization state input to the polarizer is arbitrary in general. The polarizer couples light of undesired polarizations out of the fiber and permits light having only a selected desired polarization to propagate through the fiber. Bergh discloses a fiber optic polarizer including a length of optical fiber mounted in a curved groove in a quartz substrate. The substrate and a portion of the optical fiber are ground and polished to remove a portion of the cladding from the fiber to form an interaction region. The portion of the fiber in the groove is convexly curved as viewed looking toward the polished surface. The birefringent crystal mounted on the substrate over the interaction region is in close proximity to the core of the fiber optic material. The crystal is positioned to partially intersect the path of light propagating in the optical fiber so that evanescent field coupling couples light of undesired polarizations from the optical fiber into the crystal.

The birefringent crystal has different wave velocities for waves of different polarizations. With polarizations for which the wave velocity in the crystal is less than the wave velocity in the optical fiber, the light carried by the optical fiber excites a bulk wave in the crystal, which causes light to escape from the optical fiber into the crystal. No bulk wave is excited in the crystal for polarizations having wave velocities in the crystal greater than in the fiber so that light having such polarizations remains guided within the optical fiber. The indices of refraction of the crystal are such that a wave having a polarization along one of the principle axes of the crystal will propagate more slowly in the crystal than the optical fiber; and a wave having a polarization along a second principle axis will propagate at a greater speed in the crystal than in the optical fiber.

An improved apparatus for producing light of a known polarization includes a polarization controller placed in the fiber between the light source and the polarizer with the polarization controller being adjusted to provide light of a desired polarization for input into the polarizer. However, in a typical system the polarization state input to the polarization controller varies due to the environmental sensitivities of the optical fiber. Variations in temperature and pressure, vibrations, and aging of the materials may cause significant changes in the polarization output from the polarization controller to the polarizer. Therefore, in a system which includes a polarization controller fixed to vary the polarization of light input by a predetermined amount, the time varying polarization of the light input to the polarization controller causes signal fading.

Other problems associated with prior polarizers are that naturally occurring crystals may not have the desired indices of refraction since each naturally occurring crystal has only certain indices of refraction determined by the crystalline structure, and it is difficult to adequately bond the crystal to the substrate. The crystals are not environmentally stable, which is another source of error.

A second improved polarizer includes a feedback system for detecting the light coupled out of the fiber, which represents an error signal. The error signal is used to adjust the polarization of the light input to the polarizer to minimize the amount of light coupled out of the system.

The effectiveness of such polarizers is highly dependent upon the index of refraction of the crystal. Unfortunately, the indices of refraction of birefringent crystals are highly temperature-sensitive. In order to be suitable for inertial guidance applications, a rotation sensor must have a high degree of temperature stability because such rotation sensors must be operable over a range of temperature from $-65$ degrees Celsius to $+85$ degrees Celsius according to standard military specifications. Such temperature extremes might be experienced by aircraft and missiles while in operation between low altitudes and high altitudes.

SUMMARY OF THE INVENTION

The present invention overcomes the difficulties associated with prior art polarizers by providing a polarizer which is environmentally stable, easy to bond to the substrate and has indices of refraction which may be controlled between certain limits.

The stable polarizer of the present invention includes an optical fiber mounted in a curved groove in a substrate as disclosed in Bergh. However, rather than using a naturally occurring crystal, the present invention includes alternating layers of two different types of glasses secured together to form a sandwich with one outer surface of the sandwich being secured to the substrate. The two different types of glasses have different indices of refraction and form a phase grating. The period of the grating is chosen to be less than half the optical wave length so that no diffraction occurs; however, the phase grating will exhibit different indices of refraction depending upon whether light propagating in the fiber is polarized parallel or perpendicular to the grating. The indices of refraction of the glasses and the dimensions of the grating are chosen to simulate a birefringent crystal. The thermal sensitivities of the indices of refraction of the glasses are matched to that of the fiber to obtain stable operation under wide temperature variations. The indices of refraction of the glasses and the thicknesses of the layers are chosen to provide a high quality, low loss stable fiber optic polarizer having an extinction ratio of at least 100 db.

BRIEF DESCRIPTION OF THE DRAWINGS

FIG. 1 is a partial cross-sectional view of a prior art polarizer including birefringent crystal placed adjacent the interaction region of a half-coupler;

FIG. 2 is a partial cross-sectional view illustrating a second prior art polarizer including a half-coupler having a thin metallic film deposited on the substrate over the interaction region;

FIG. 3 is a partial cross-sectional view illustrating the stable fiber optic polarizer of the present invention including a half coupler with a phase grating comprising alternating layers of different glasses attached to the substrate over the interaction region;

FIG. 4 is expanded elevation view of a portion of the phase grating of FIG. 3 illustrating the periodicity and dimensional characteristics thereof.

DESCRIPTION OF THE PREFERRED EMBODIMENT

Figure 5:
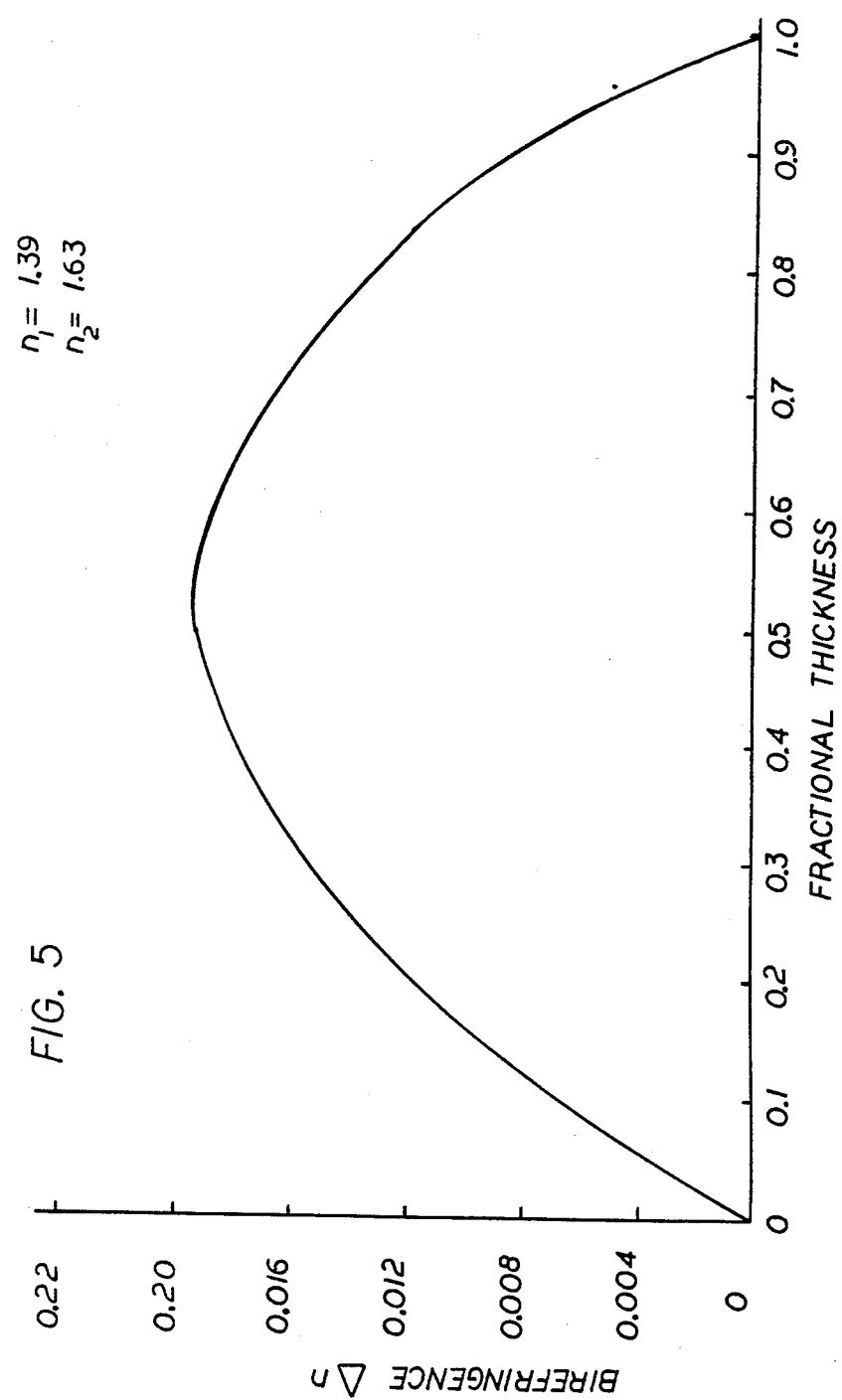
FIG. 5 is a graph of the difference between the indices of refraction of the phase grating of FIG. 4 as a function of the ratio of dielectric layer thicknesses.

Structural and functional advantages of the present invention may be better appreciated by first explaining the structure and function of two prior art polarizers.

Referring to FIG. 1, a polarizer 10 includes a half coupler 12 that comprises a substrate 14, preferably formed of a quartz block, having a curved groove 16 therein. A length of optical fiber 18 having a core 20 and a cladding 22 is secured in the groove 16. A portion of the substrate 14 has been ground and polished down to form a surface 24 that extends into the cladding 22. The grinding and polishing operation removes a portion of the cladding 22 to form an elongate interaction region 26. A birefringent crystal 28 having optically flat surface 30 is mounted to the surface 24 of the substrate 14. In the interaction region 26, the evanescent field of light propagating in the fiber 18 interacts with the birefringent crystal 28.

If the fiber 18 is a single mode fiber, then the only modes propagated are those in which the directions of the electric and magnetic fields are approximately perpendicular to the direction of propagation of the wave through the fiber 18. In FIG. 1, the vector 32 represents the direction of propagation of light through the fiber 18, and the vector 34 represents a polarization perpendicular to the direction of propagation of the light wave. The direction of propagation and the perpendicular polarization are in the plane of the page. The encircled dot 36 represents a polarization vector parallel to the interface 24 between the fiber 18 and the birefringent crystal 28 at the interaction zone 26 and perpendicular to the plane of the page.

The crystal 28 is arranged so that for light polarized perpendicular to the crystal-fiber interface 24, the refractive index of the crystal 28 is less than the refractive index of the fiber 18. Therefore, light propagating within the optical fiber 18 with a polarization perpendicular to the crystal-fiber interface 24 remains in the optical fiber 18 because of total internal reflections at the crystal-fiber interface 24. The index of refraction of the crystal 28 for polarizations parallel to the crystal-fiber interface 24 is chosen to be greater than the index of refraction of the optical fiber 18 so that light polarized parallel to the crystal-fiber interface 24 couples out of the optical fiber 18 into the birefringent crystal 28. The vector 38 of FIG. 1 represents the direction of polarization of light polarized perpendicular to the crystal-fiber interface 24 which has propagated past the interaction region 26 and out of the polarizer 10. The encircled dot 40 represents light having polarization parallel to the crystal-fiber interface 24, indicating the polarization of the light that has propagated out of the crystal fiber 18 and through the birefringent crystal 28.

From the foregoing it may be seen that the relevant parameters for determining the polarization output of the polarizer 10 are the input polarization components perpendicular and parallel to the crystal-fiber interface 24, the index of refraction of the fiber, the index of refraction in the birefringent crystal 28 for light polarized perpendicular to the crystal-fiber interface 24, and the index of refraction of light in the crystal 28 for light polarized parallel to the crystal-fiber interface 24.

Difficulties associated with the limited range of indices of refraction of crystals and the environmental instability of the indices of refraction of available crystals limit the applicability of the polarizer 10 and variations thereof in rotation sensing systems.

FIG. 2 represents a polarizer 46 designed to avoid the thermal and mechanical difficulties associated with the crystal 28. The polarizer 46 includes a half coupler 12, substantially identical to the half coupler 12 of FIG. 1. A thin metallic film 48 is deposited upon the surface 24 to cover the interaction region 26. The metallic film 48, which may be an aluminum film, by way of example, absorbs all polarizations that are not perpendicular thereto. Therefore, the polarizer 46 transmits only polarizations perpendicular to the interface between the conducting sheet 48 and the fiber 18, which is a dielectric. Verification of the transmission and absorption characteristics of the polarizer 46 involves solving the electromagnetic boundary value problem at the fiber-metal film interface.

The polarizer 46 typically has an extinction ratio of only 20–30 db. The extinction ratio of a polarizer is the ratio of the intensity of light in the undesired polarization mode retained in the optical fiber 18 to the intensity of light in the desired polarization mode retained within the fiber 18, assuming equal inputs in the polarizations parallel and perpendicular to the conducting sheet 48 into the polarizer 46. The insertion loss of the polarizer 46 is rather high, typically 2–3 db. In fiber optic rotation sensors, it is well known that an error source exists that is proportional to the square root of the extinction ratio. Therefore, a polarizer having a 100 db extinction ratio has an error source magnitude of about $10^5$ relative to the input signal. For high accuracy rotation sensors, the error source must be as small as possible. Presently known film polarizers are inadequate for fiber optic rotation sensor applications because of the relatively low extinction ratio and the high insertion loss.

Referring to FIG. 3, a stable polarizer according to the invention includes a half coupler 12 and a phase grating 52 formed of first dielectric material 54 having a first dielectric constant and a second dielectric material 56 having a second dielectric constant. It has been found that making the composite grating structure of alternating layers of the first and second dielectrics 54, 56, respectively, produces a device that acts as a homogeneous birefringent material. The thickness of two adjacent layers of the dielectrics 54, 56 is the period, P, of the phase grating 52. A grating whose periodicity is smaller than one-half the wavelength of the incident radiation will produce no diffracted orders. The properties of the artificially created birefringent material depend upon the profile, thickness and line-to-space ratio of the phase grating 52. Using state of the art submicrometer fabrication technology, it is possible to produce the phase grating 52 to have a periodicity substantially less than one-half the wavelength of coherent light ordinarily used in fiber optic sensor applications.

Referring to FIG. 4, the distance P is shown in an expanded scale. It is convenient to express the thickness of the first dielectric layer 54 as a fraction q of the period P so that the thickness of the first dielectric layer 54 is given by qP. In a typical application, the periodicity, P, is 1,000 A and thickness qP of the second dielectric is 100 A. Flanders, "Submicrometer Periodicity Gratings as Artificial Anisotropic Dielectrics", *Appl. Phys. Lett.* 42(6) Mar. 15, 1983 reports fabrication of a 240 nm period dielectric grating. The first dielectric layer 54 may be conveniently formed of silicon-dioxide glass, and the second dielectric layer 56 may be titanium-dioxide glass. The refractive indices of the layers 54 and 56 should differ from that of the cladding 22.

Rigorous calculation of the electromagnetic properties of phase gratings in the optical regime is difficult. The problem is greatly simplified by assuming that the grating period is much smaller than the optical wavelength. In the strictest sense, requiring the period to be much less than the wavelength is difficult to meet in some regions of the spectrum, particularly the visible region and regions having wavelengths shorter than the wavelengths of the visible spectrum. However, if the period is less than half the wavelength, there will be no diffracted orders; and the phase grating will act as an anisotropic medium, although actual measured values of the indices of refraction may not agree precisely with the results of the simplified analysis.

For purposes of analysis, the phase grating can be treated as a periodic stratified medium sandwiched between two homogeneous dielectrics, one being the fiber cladding, the other being air. It is possible to calculate the optical properties of periodic stratified media using the theory of electromagnetic Bloch waves. The problem basically involves matching the electromagnetic boundary conditions at each interface. It is well known from Maxwell's equations that components of the electromagnetic field vector parallel to the layers must be continuous and that the components of the electric field vectors perpendicular to the interfaces are discontinuous and related to the indices of refraction of the materials according to $$n_1 E_1^2 = n_2 E_2^2 \quad (1)$$

where $E_1$ and $E_2$ are the perpendicular components of the electric field on the two sides of a dielectric interface and $n_1$ and $n_2$ are the indices of refraction of the two dielectrics.

The thickness of the cladding 22 at the interaction region 26 must be such that the evanescent field of light propagating in the fiber 18 interacts with the birefringent phase grating 52 so that light of a selected polarization couples out of the fiber 18 into the phase grating 52 while light of another selected polarization remains in the fiber 18. Light polarized parallel to the phase grating 52 is shown to be coupled out of the fiber 18 while light polarized perpendicular to the phase grating 52 remains in the fiber 18. However, it is possible to construct the phase grating 52 to transmit only parallel polarizations in the fiber 18 and to couple out perpendicular polarizations Since the direction of propagation of the wave in the fiber at the interaction region is essentially parallel to the layers of the first and second dielectrics, it is possible to treat the boundary value problem as an array of periodic dielectric wave guides. Both analyses of the problem give the same result if the period is much less than the wavelength for propagation parallel to the layers. The result is that for the effective indices of refraction $n_\parallel$ for electric fields parallel to the layers and $n_\perp$ for electric fields perpendicular to the layers;

$$n_\parallel = [n_1^2 q + n_2^2 (1-q)]^{\frac{1}{2}} \quad (2)$$

$$n_\perp = [(1/n_1^2) q + (1/n_2^2)(1-q)]^{-\frac{1}{2}} \quad (3)$$

FIG. 5 shows a plot of $\Delta n = n_\parallel - n_\equiv$ for AlF$_3$ having $n_1 = 1.39$ and Al$_2$O$_3$ having $n_2 = 1.63$. . The result is a continuous range of $\Delta n$ for any $n_2$ and that $\Delta n$ can be relatively large when $n_2$ is relatively large.

It is possible to form suitable phase gratings on the fiber cladding and substrate by sputtering alternate layers of silicon dioxide and titanium dioxide.

Other ways to make the grating 52 include any technology for forming thin films, such as a wet chemical process, such involves alternately dipping the fiber or a substrate in sol-gel and drying to form a desired number of layers, epitaxial growth and molecular beam growth.

What is claimed is:

1. A stable fiber optic polarizer for receiving an input optical signal having an arbitrary polarization and providing an output optical signal having only a single selected polarization, comprising:

a length of optical fiber having a core and a cladding surrounding the core, a portion of the cladding having a selected thickness to form an interaction region, the cladding having a predetermined cladding refractive index; and a composite multilayer dielectric structure positioned adjacent the interaction region, the composite multilayer dielectric structure including at least one layer of a first dielectric material having a first refractive index and at least one layer of a second dielectric material having a second refractive index, and first and second refractive indices being less than and greater than, respectively, the cladding refractive index, the layer thicknesses and refractive indices of the first and second dielectric materials cooperating to provide a refractive index $n_\parallel$ for light in the optical fiber polarized parallel to the layers of the composite multilayer dielectric structure at the interaction region and a refractive index $n_\perp$ for light in the optical fiber polarized perpendicular to the layers of the composite multilayer of the composite multilayer dielectric structure at the interation region such that light of a selected polarization remains in the optical fiber and light of other polarizations interacts with the composite multilayer dielectric structure via evanescent field coupling at the interaction region to remove the other polarizations from the optical fiber.

2. The stable fiber optic polarizer of claim 1 wherein the composite multilayer dielectric structure includes a plurality of alternating layers of the first and second dielectric materials having a first thickness and a second thickness, respectively.

3. The stable fiber optic polarizer of claim 2 comprising a base having a slot therein, a length of said optical fiber being mounted within said slot so that the cladding forms a generally planar surface facing outwardly from the slot at the interaction region.

4. The stable fiber optic polarizer of claim 1 wherein the refractive index $n_\parallel = [n_1^2 q + n_2^2 (1-q)]^{\frac{1}{2}}$ for polarizations parallel to the layers of the composite multilayer dielectric structure, and the refractive index $n_\perp = [q n_1^{-2} + (1-q) n_2^{-2}]^{-\frac{1}{2}}$ for polarizations perpendicular to the layers of the composite multilayer dielectric structure, where $n_1$ is the refractive index of the first dielectric material, $n_2$ is the refractive index of the second dielectric material and q is the ratio of the thickness of the first layer to the sum of the thicknesses of the first and second layers.

5. The stable fiber optic polarizer of claim 1 wherein said composite multilayer dielectric structure includes a plurality of alternating layers of the first dielectric material having a first thickness and the second dielectric material having a second thickness.

6. The stable fiber optic polarizer of claim 1 wherein the first and second indices of refraction of the composite multilayer dielectric structure have substantially the same temperature dependence as the index of refraction of the cladding.

7. A method for polarizing light, comprising the steps of:
   forming a length of fiber optic material having a core and a cladding surrounding the core, the cladding having a cladding refractive index, a portion of the cladding having a thickness selected to form an interaction region;
   placing a layer of a first dielectric material having a first refractive index adjacent the interaction region;
   placing at least one layer of a second dielectric material having a second refractive index adjacent the first layer of dielectric material, the layers of the first and second dielectric materials forming a composite multilayer dielectric structure having a refractive index $n_\parallel$ for light in the fiber optic material polarized parallel to the layers of the composite multilayer dielectric structure at the interaction region and a refractive index $n_\perp$ for light in the fiber optic material polarized perpendicular to the layers of the composite multilayer dielectric structure at the interaction region such that light of a selected polarization propagates in the fiber optic material past the interaction region and light of other polarizations couples out of the fiber optic material at the interaction region; and
   forming the composite multilayer dielectric structure from dielectric materials having refractive indices having temperature dependences substantially the same as the temperature dependence of the cladding refractive index so that temperature fluctuations of the composite multilayer dielectric structure and the fiber optic material within a predetermined range have substantially no effect upon the polarization of light that propagates in the length of fiber optic material past the interaction region.

8. The method of claim 7 including the step of forming the first layer and the second layer such that the refractive index $n_\parallel = [n_1^2 q + n_2^2 (1-q)]^{\frac{1}{2}}$ for polarizations parallel to the layers of the composite multilayer dielectric structure, and the refractive index $n_\perp = [q n_1^{-2} + (1-q) n_2^{-2}]^{-\frac{1}{2}}$ for polarizations perpendicular to the layers of the composite multilayer dielectric structure, where $n_1$ is the refractive index of the first dielectric material, $n_2$ is the refractive index of the second dielectric material and q is the ratio of the thickness of the first layer to the sum of the thicknesses of the first and second layers.

9. A method for polarizing light comprising the steps of:
   forming a length of fiber optic material having a core and a cladding surrounding the core with a portion of the cladding having a thickness selected to form an interaction region:
   placing a phase grating adjacent the interaction region, the phase grating having a first refractive index for light of a first polarization and a second refractive index for light of a second polarization such that light of the first polarization propagates in the fiber beyond the interaction region while light of the second polarization interacts with the phase grating to couple out of the fiber optic material into the phase grating: and
   forming the phase grating from dielectric materials having refractive indices having temperature dependences substantially the same as the temperature dependence of the index of refraction of the cladding so that temperature fluctuations of the phase grating and fiber optic material with a predetermined range have substantially no effect upon the polarization of light that propagates in the fiber optic material beyond the interaction region.

* * * * *